United States Patent [19]

Lazzarotti et al.

[11] Patent Number: 5,069,440
[45] Date of Patent: Dec. 3, 1991

[54] APPARATUS AND METHOD FOR AUTOMATICALLY AND CONTINUOUSLY PRODUCING A FLOW OF SINGULATED MAIL FLATS

[75] Inventors: S. James Lazzarotti, Broomall; Edward A. Wojtowicz, Bryn Mawr; Eugene T. Mullin, Phoenixville; Jess Nadel, Downingtown, all of Pa.

[73] Assignee: Unisys Corporation, Blue Bell, Pa.

[21] Appl. No.: 504,953

[22] Filed: Apr. 5, 1990

[51] Int. Cl.[5] .................. B65H 29/68; B65H 9/00
[52] U.S. Cl. ............................ 271/202; 271/2; 271/227; 198/415; 198/460; 198/461
[58] Field of Search ............ 271/2, 176, 182, 198, 271/199, 202, 203, 216, 227, 228, 265, 266, 270; 198/415, 444, 460

[56] References Cited

U.S. PATENT DOCUMENTS

| | | | |
|---|---|---|---|
| 2,961,085 | 11/1960 | Stovall | 271/2 |
| 3,044,767 | 7/1962 | Winkler et al. | 271/2 |
| 3,153,533 | 10/1964 | Novick | 271/2 |
| 3,240,487 | 3/1966 | Templeton | 271/228 |
| 3,771,641 | 11/1973 | Jönsson et al. | 198/444 |
| 3,955,812 | 5/1976 | Suda et al. | 271/182 |
| 4,150,743 | 4/1979 | Lazzarotti et al. | 198/460 |
| 4,161,244 | 7/1979 | Hunter et al. | 198/460 |
| 4,227,607 | 10/1980 | Malavenda | 198/460 |
| 4,511,242 | 4/1985 | Ashbee et al. | 271/227 |
| 4,634,328 | 1/1987 | Carrel | 198/444 |
| 4,955,964 | 9/1990 | Hain | 271/227 |
| 4,971,304 | 11/1990 | Lofthus | 271/227 |

FOREIGN PATENT DOCUMENTS 124459  6/1986  Japan .................... 271/227

Primary Examiner—H. Grant Skeggs
Assistant Examiner—Steve Rein
Attorney, Agent, or Firm—Whitham & Marhoefer

[57] ABSTRACT

An apparatus (10) for producing a singulated flow of correctly oriented flats (100 or 160) includes an input conveyor (12), a plurality of singulating conveyors (14, 16, and 18), and a skew correction station (20). A stack of flats (100 or 160) is deposited onto an inclined surface (42) of the input conveyor (12). The input conveyor (12) produced a running shingle of flats by frictionally engaging and pulling the bottom most flat in the stack. The plurality of singulating conveyors (14, 16, and 18) convert the running shingle into a singulated flow using frictional, inertial, and gravitational forces. By advancing conveyor (16) while halting conveyor (14), a flat (102) is pulled from underneath flat (108) with flat (108) remaining stationary. By operating conveyor (16) in a pulsed acceleration mode, passenger flat (122) is separated from underlying flat (120). By angling the conveyors (14, 16, and 18) in an upward direction, rearward gravitational force passenger flats (134 and 136) down conveyor (14). Halting the conveyors (202, 204, 206, 208, and 210) of the skew orientation station (20) can achieve forward gravitational separation of passenger flat (150). The skewed orientation of mail piece (200) is adjusted by selectively lifting the belts (202 and 206) and driving the belts (202 and 206) in opposite directions.

23 Claims, 7 Drawing Sheets

APPARATUS AND METHOD FOR AUTOMATICALLY AND CONTINUOUSLY PRODUCING A FLOW OF SINGULATED MAIL FLATS

BACKGROUND OF THE INVENTION

1. Field of the Invention

The subject invention is directed to an apparatus used for separating individual mail pieces from a stack and correctly orienting those mail pieces for further processing and, more particularly, to an apparatus comprised of multiple conveyor subsystems oriented in series where the conveyors are individually controlled.

2. Description of the Prior Art

The process of separating one mail piece from a stack is referred to as singulation. Singulating mail pieces is an essential step in processing the mail pieces to their ultimate destination. Special problems arise in the singulation process when handling mail pieces, called "flats", which fall within the following size ranges: height between three and fifteen inches, length between four and a quarter inches and fifteen inches, thickness between seven one thousandths of an inch and one inch, and weight up to four pounds. Such mail flats may include magazines, folded newspapers, stiff documents such as vehicle license plates, as well as large envelopes.

Many prior art feeders use vacuum forces to accomplish singulation. In operation, a vacuum head applies suction to one side of a mail flat and separates it from the other flats by picking it up and transporting it. The vacuum pickup heads in these feeders are virtually useless in handling mail pieces such as magazines and folded newspapers because the vacuum forces can only apply vacuum suction to one, or a few, of the multiplicity of sheets of the magazine or newspaper, leaving the rest of the sheets to dangle freely from the pickup head. In addition, present day feeders generally operate on the principle that mechanization is provided only to separate the first document from a stack of documents, with little or no provision being made for further attempts at separation. Thus, if a double feed occurs, the documents enter the system and eventually must be removed before further processing can be performed.

U.S. Pat. No. 4,328,962 to Akers discloses an envelope feeder apparatus for use with mail sorting machines which includes a plurality of conveyor subsystems. Each conveyor subsystem has a pair of friction belts. Each of the belts has a plurality of holes which allow a suction pressure to be exerted therethrough for aiding in holding a leading envelope against the friction belts. The Akers device is not designed to singulate a pile of randomly sized and oriented mail pieces; rather, envelopes, all of which are the same size, must be correctly placed in an angularly oriented magazine before being transported through the device. Hence, the conveyor subsystems of the Akers device are merely designed to move envelopes through a plurality of different stations.

U.S. Pat. No. 4,697,689 to Carrell discloses an article manipulation system for singulating a heap of irregular mail pieces and orienting the mail pieces with the address in the upward direction. The singulating subsystem comprises a plurality of cylindrical rollers, each having a high friction surface for engagement with mail pieces and each being independently driven by a motor. The rollers are separated from one another and are in a generally horizontal plane. A set of low friction slats are positioned between adjacent rollers at a level slightly below the topmost surface of the rollers. The rollers and the slats are in close enough proximity to one another such that mail pieces are prevented from sliding therebetween. The singulation process is enhanced through coordinated operation of the motors. When the rollers are moved together, the parcels are conveyed across the singulation subsystem. When the rollers moved individually, they separate parcels from the heap. In the Carrell device, the cooperative action of the rollers does not always produce singulation, i.e., isolation of a single parcel; therefore, Carrell has found it necessary to provide a robotic arm between the singulating subsystem and the orienting subsystem which pushes and lifts parcels to separate them.

SUMMARY OF THE INVENTION

It is therefore an object of this invention to provide an apparatus useful in singulating a randomly oriented stack of letter and mail flats where the letter and mail flats have a broad range of sizes and weights.

It is another object of this invention to provide an apparatus which includes a plurality of inclined conveyors that are individually controllable.

It is another object of this invention to provide an apparatus for singulating mail flats using a combination of frictional, inertial, and gravitational forces.

It is yet another object of this invention to provide an apparatus which dynamically corrects for the skewed orientation of mail pieces in the output singulated flow of mail while the singulating stages are in progress.

According to the invention, an apparatus is provided which comprises an input conveyor, a series of individually controlled high friction belt conveyors, and an orientation subsystem including a plurality of parallel, skew correction conveyors and an inclined output stage. The input conveyor creates a running shingle of mail flats from a stack of randomly oriented, randomly sized pile of mail flats. Control circuitry operates the series of individually controlled high friction belt conveyors to singulate the mail flats from the running shingle. The control circuitry receives mail flat leading edge information from optical scanning equipment positioned at each belt conveyor and operates adjacent conveyors in the series in a manner which tends to separate the mail flats. Frictional separation is achieved by running the "front" conveyor while stopping the "rear" conveyor of adjacent conveyors in the series, i.e., a flat with a substantial portion on the "front" conveyor is pulled forward by the frictional engagement with the moving, "front" conveyor while a flat having a substantial portion on the "rear" conveyor remains stationary by its frictional engagement with the stopped, "rear" conveyor. Inertial separation is achieved by applying momentary pulses of acceleration to the conveyors on which the flats are being moved, i.e., a flat resting on the conveyor will be pulled forward due to its high frictional engagement with the conveyor while a flat resting on top of another flat (a "passenger" flat) will not be pulled forward due to its weak frictional engagement with the underlying flat. Each of the conveyors in the series is inclined such that gravitational forces act on the running mail pieces, i.e., a flat positioned on top of another flat will tend to be pushed rearward due to gravity, thus separating the flats.

The orientation subsystem is positioned in series after the high friction belt conveyors used for singulating the mail. The first stage of the orientation subsystem comprises a plurality of narrow, individually operable, parallel belt conveyors. A flat will bridge several of the parallel conveyors. The orientation of the flat is corrected by raising selected belts in the orientation subsystem and moving those belts in appropriate directions. The skewed orientation of the flat can be corrected such that it is roughly square. The flat is then fed to the output stage of the orientation subsystem where it becomes fully squared by coming to rest on a ledge. The output stage is positioned on a downward incline to provide a final separation point for flats which have advanced through the system without being singulated (this can occur with flats that are mechanically interlocked at their rear portions by a dog ear corner, etc.). Separation is achieved by taking advantage of forward gravitational forces, whereby a topmost flat will tend to slide down the output stage faster and the bottom most flat will be frictionally retarded or retained by the parallel belts and drive wheels.

BRIEF DESCRIPTION OF THE DRAWINGS

The foregoing and other objects, aspects and advantages of the invention will be better understood from the following detailed description of the preferred embodiments of the invention with reference to the accompanying drawings, in which.

DETAILED DESCRIPTION OF THE PREFERRED EMBODIMENTS OF THE INVENTION

Figure 1:
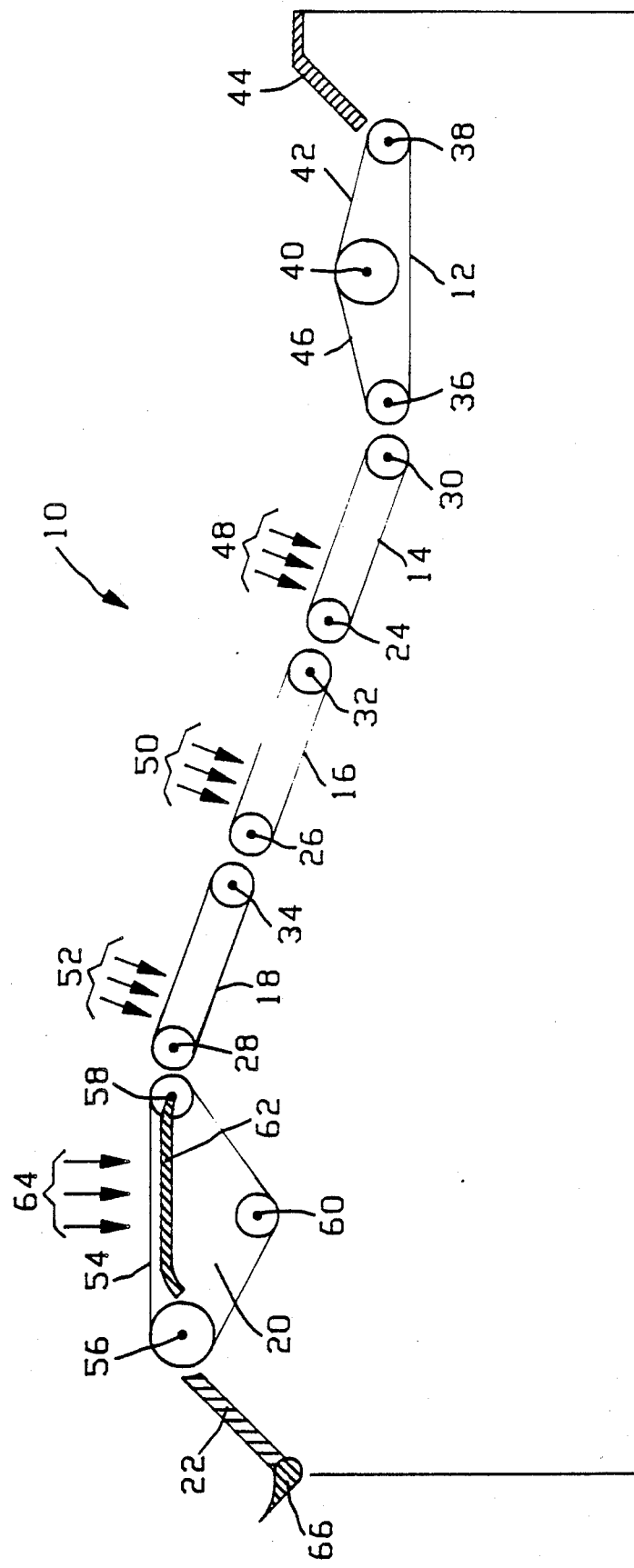
FIG. 1 is a side view of the invention showing the input, singulation, and orientation subsystems.

Referring now to the drawings and more particularly to FIG. 1, there is shown the inventive apparatus 10 which comprises an input conveyor 12, a plurality of singulating conveyors 14, 16, and 18, a skew correction station 20, and an inclined output slide 22. Each singulating conveyor 14, 16, and 18, has motor driven rollers 24, 26, and 28, respectively, and rear idler rollers 30, 32, and 34, respectively. The singulating conveyors 14, 16, and 18 are approximately eighteen inches wide and sixteen inches in length. The belts for the singulating conveyors 14, 16, and 18 are made of commercially available high friction rubber materials which are capable of frictionally engaging a mail piece positioned thereon and moving it upward against the earth's gravitational force exerted against the mail piece by virtue of the conveyor's 14, 16, and 18 inclined orientation. While the apparatus 10 is shown with three inclined, singulating conveyors 14, 16, and 18 arranged in series, it should be understood that a different number of conveyors could be used to fulfill the mail separation operations.

The input conveyor 12 includes a motor driven roller 36, a rear, idler roller 38, and a large, upwardly biased idler roller 40. The input conveyor 12 is divided into two sections by the upwardly biased idler roller 40; a first, inclined section 42 receives flats from mail input chute 44, and a second, downward sloping section 46 aids in creating a running shingle of mail flats. The running shingle of mail flats is directed to the series of three inclined, singulating conveyors 14, 16, and 18 where the mail flats are "singulated", i.e., separated from one another. Each singulating conveyor 14, 16, and 18, has an associated detector array 48, 50, or 52, respectively, that is preferably comprised of an array of laser scanners or photocells (represented by downward pointing arrows). The laser scanners or photocells sense the leading edges of flats progressing up the singulating conveyors 14, 16, or 18. As is discussed below, control circuitry (not shown) uses data from the detector arrays 48, 50, and 52 to individually drive the rollers 24, 26, and 28, in manners which tend to separate mail flats from one another.

The skew correction station 20 is positioned in series after the last singulating conveyor 18. A plurality of parallel drive belts, of which only belt 54 is shown, are each driven around three rollers 56, 58, and 60. The large front roller 56, is connected to a motor operating in conjunction with individually controlled clutch systems (not shown) which permit each belt 54 to be moved in either direction around the rollers 56, 58, and 60 or to be momentarily stopped. The rear, idler roller 58 includes belt lifter arm 62 which is selectively actuable to lift the belt 54 upwards assisting in the reversal movement. The bottom, idler roller 60 is a spring loaded floating idler which compensates for belt 54 lift displacement. A detector array 64 detects the orientation of a mail piece on the skew correction station 20. The detector array 64, like the detector arrays 48, 50, and 52 for the singulating conveyors 14, 16, and 18, respectively, is preferably an array of laser scanners or photocells indicated by downwardly directed arrows. As will be discussed below, control circuitry (not shown) uses data from the detector array 64 to selectively lift arm 62 upwards and drive roller 56 in an appropriate direction such that the mail piece on the skew correction station 20 is roughly squared. Mail output from the skew correction station 20 becomes fully squared by sliding down output slide 22 and resting against ledge 66. A mail piece resting on ledge 66 can then be directed to a mail sorting machine for further processing. In addition to serving as a mail collection station, the output slide 22 also provides a final singulating step for mail which may have progressed through the system without being separated.

Figure 2:
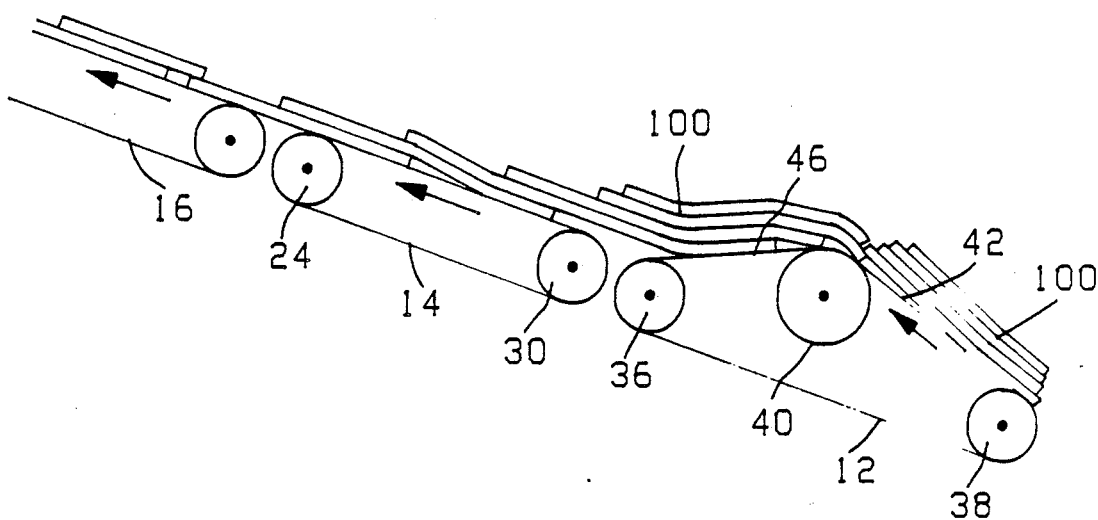
FIG. 2 is a side view of the input conveyor and adjacent singulating conveyors showing a running shingle or flats being created from a stack of randomly oriented mail.

FIG. 2 shows the input conveyor 12 creating a running shingle from a stack of flats 100. The flats 100 in the stack can be of varying sizes, and the stack is typically created by depositing stacks of flats 100 onto the input conveyor 12 in a random arrangement. As the stack of flats 100 advances up the inclined surface 42 of input conveyor 12, the stack leans backward, allowing the bottom most flats 100 to be pulled from under the stack. The pulling force on the bottom most flats 100 arises from the frictional engagement of these flats 100 with the input conveyor belt 12 and the forward motion of the input conveyor belt 12 created by drive wheel 36. Flats 100 which are higher up in the stack tend to slide backward due to gravity. The frictional engagement with an underlying flat 100 is relatively weak, thereby allowing the top most flats 100 to slide relatively freely. The process of pulling the bottom most flats 100 from underneath the stack while the top most flats 100 slide backward is called "shingulation" because a coarse running shingle of flats 100 is created, i.e., the leading edges of adjacent flats 100 are linearly spaced with the bottom flats 100 being further along than the upper flats 100. In addition to the inclined surface 42 of input conveyor 12, the idler wheel 40 is positioned to create a downward sloping surface 46 which helps to isolate the leading portion of the shingled stream, producing separation between the rearward and forward leaning surfaces.

Figure 3:
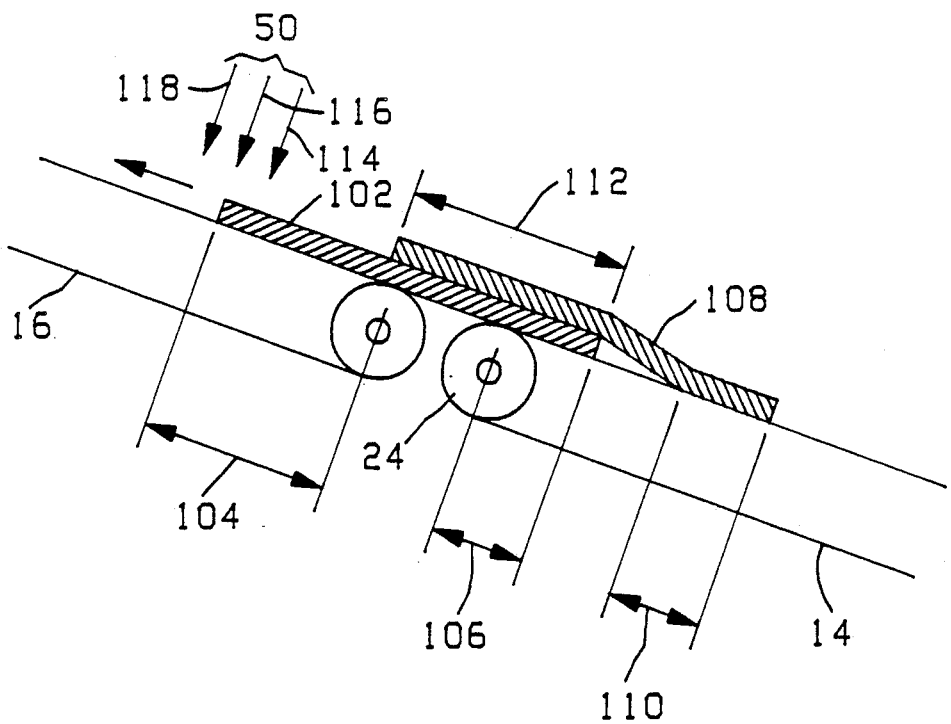
FIG. 3 is a side view of a pair of adjacent singulating conveyors illustrating the frictional separation of mail pieces.
Figure 4A:
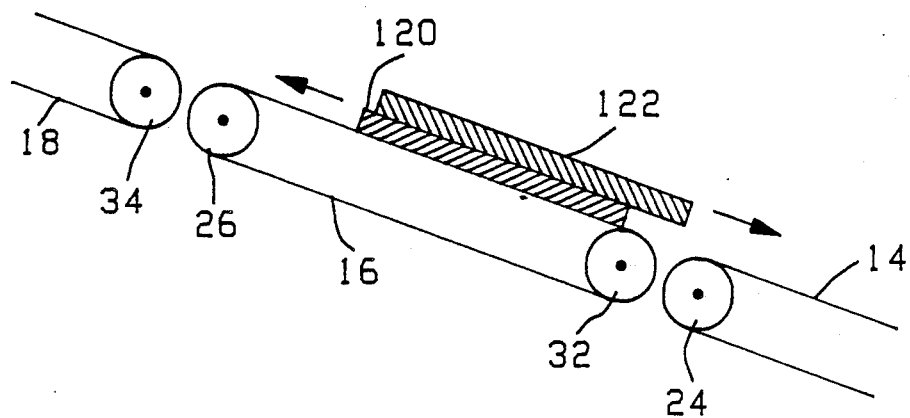
FIGS. 4a-c are side views of adjacent singulating conveyors illustrating the inertial separation of mail pieces.
Figure 4B:
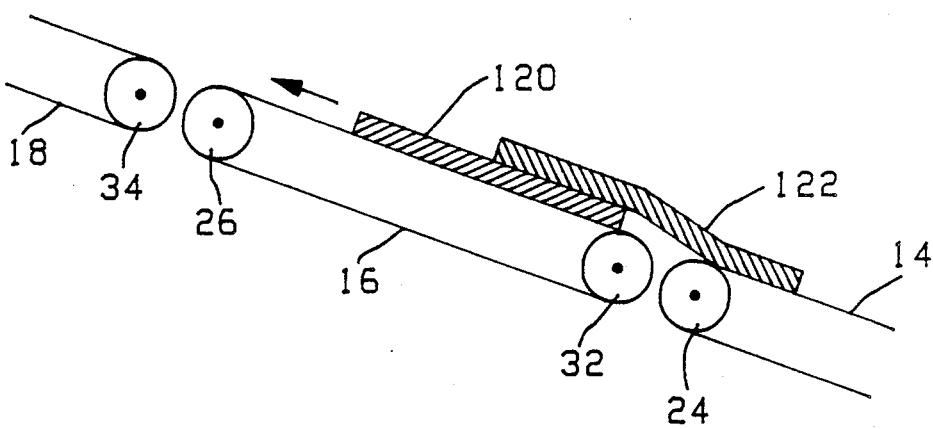
Figure 4C:
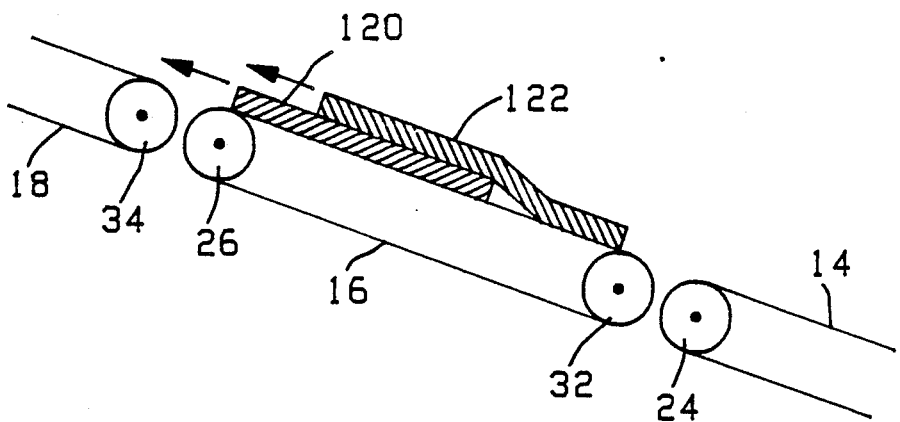
Figure 5:
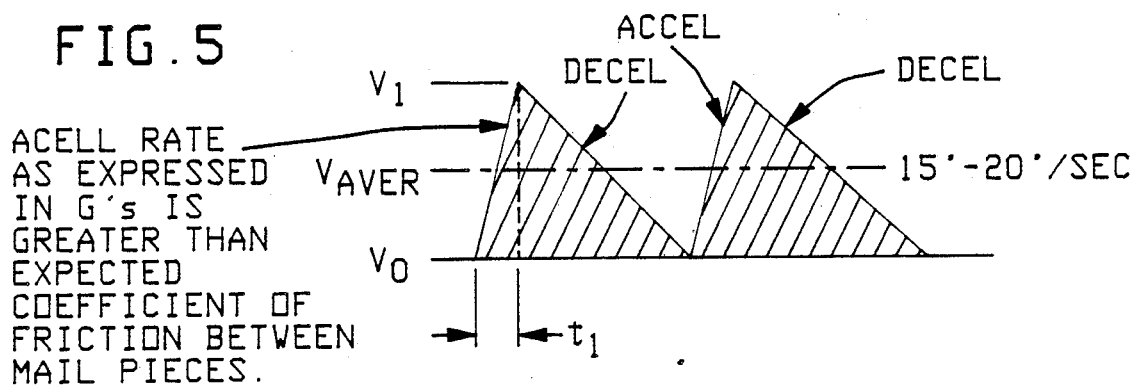
FIG. 5 illustrates the ideal saw tooth profile pulse shape used for driving the conveyor motors to achieve inertial separation.
Figure 6:
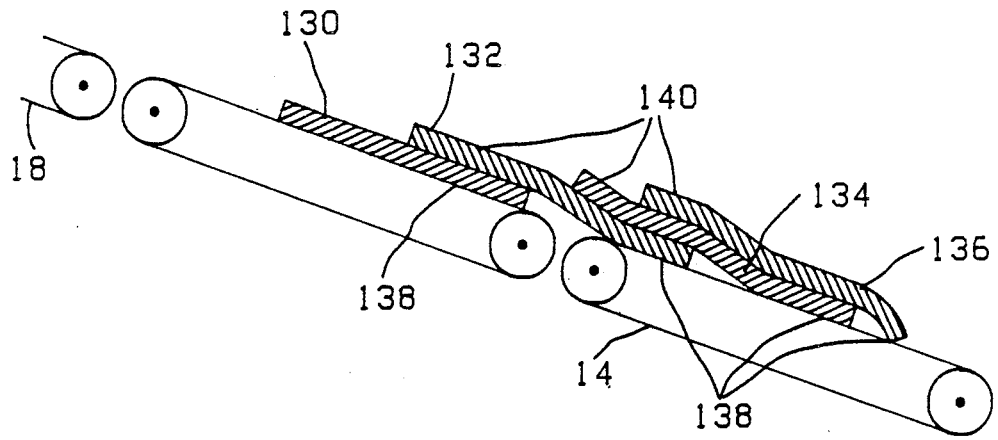
FIG. 6 is a side view of adjacent singulating conveyors illustrating rearward gravitational separation of mail pieces.
Figure 7:
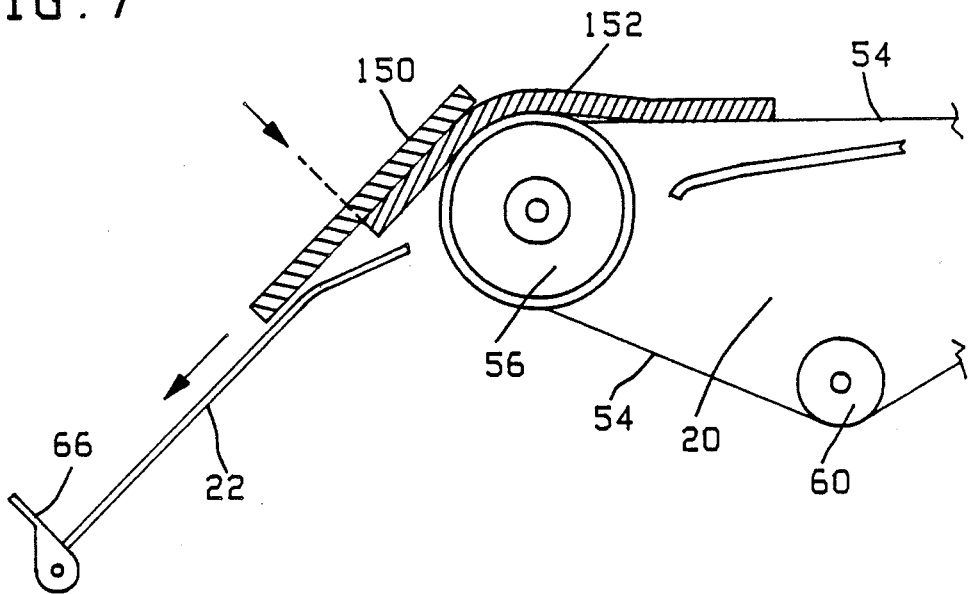
FIG. 7 is a side view of the skew correction station and the output slide of the orientation subsystem showing forward gravitational separation of mail pieces.

Mail pieces are singulated according to three different techniques using the singulating conveyors 14, 16, and 18. FIG. 3 illustrates the manner in which frictional forces are used to separate mail pieces (this is the primary singulation control scheme). FIGS. 4a-c illustrate the manner in which inertial forces, created by pulsed acceleration of the drive wheels 24, 26, and 28, are used to separate the mail pieces (this is the secondary singulation control scheme). FIG. 5 shows the saw tooth pulse shape used for driving the wheels 24, 26, and 28 to achieve inertial separation. FIGS. 6 and 7 illustrate the manner in which rearward and forward gravitational forces, respectively, are used to separate mail pieces.

Referring now to FIG. 3, there is illustrated the primary separation technique used for singulating mail flats 102 and 108 which employs frictional forces. A control (not shown) selectively stops a first singulating conveyor 14 in series while advancing the second singulating conveyor 16. As discussed above, the control independently signals the drive wheels 24 and 26 for starting and stopping the movement of singulating conveyors 14 and 16, respectively. The key to obtaining full separation in this process is to advance the leading flat 102 on the moving conveyor 16 to a position where the developed frictional contact force is great enough to pull it away from the lesser frictional contact forces developed between the stationary conveyor 14. As can be seen in FIG. 3, flat 102 has an area of contact 104 (i.e., for frictional engagement) with the moving conveyor 16 that is larger than its area of contact 106 with the stationary conveyor 14. The greater area translates into a greater normal force on the lead transport conveyor 16, and therefore results in a greater frictional driving force. Hence, mail flat 102 is pulled from stationary conveyor 14 by virtue of the frictional engagement with moving conveyor 16 being stronger than the frictional engagement with stationary conveyor 14. Mail flat 108 contacts stationary conveyor 14 in area 110. The overlapping area 112 between flat 108 and flat 102 only produces a very weak frictional engagement; therefore, the flat 108 remains stationary due to its frictional engagement in area 110 with stationary conveyor 14 as flat 102 is pulled forward by moving conveyor 16.

Referring to both FIGS. 1 and 3, providing a plurality of singulating conveyors 14, 16, and 18 and a plurality of detection points 48, 50 and 52 associated with each conveyor 14, 16, and 18 allows for multiple opportunities to achieve singulation. If flat 108 was positioned directly on top of or substantially covered flat 102, singulation may not be achieved by the frictional technique alone because the flat 108 would not have enough surface area in contact with the stationary conveyor 14 to allow the flat 102 to be pulled from underneath. Therefore, as is discussed below, methods for using gravitational forces, from the conveyors 14, 16, and 18 being inclined, and inertial forces, from the conveyors 14, 16, and 18 being driven in a pulsed acceleration mode, have been provided to promote the necessary separation of flats 102 and 108 which allows the flats 102 and 108 to be separated at the next conveyor 16 or 18 in series.

The plurality of sensor arrays 48, 50, and 52 are provided to permit a number of iterative opportunities to achieve singulation at each singulating conveyor 14, 16, or 18. For example, as best shown in FIG. 3, if flat 102 does not advance from a position under sensor 114 to a position under sensor 116 after a predetermined time, the stationary conveyor 14 is re-started, thus moving the entire shingle of flats forward, i.e., both 102 and 108 move forward since both conveyors 14 and 16 are moving in unison. After the leading edge of flat 102 is detected by sensor 116, the rear conveyor 14 is halted. This action will increase the frictional contact area 104 of flat 102 on the front conveyor 16 and decrease the frictional contact area 106 on rear conveyor 14. Halting the rear conveyor 14 when the leading edge of flat 102 reaches a position under sensor 116 allows a second chance to singulate flats 102 and 108 using the frictional force scheme. If the flat 102 does not advance from a position under sensor 116 to a position under sensor 118 in a predetermined period of time, the process of re-starting and then stopping rear conveyor 14 is repeated. The number of iterations of this process is limited only by the number and spacing of sensors 114, 116, and 118 in sensor array 50 and the length of the conveyor 16.

Referring now to FIGS. 4a-c, there is illustrated a secondary separation technique for singulating mail flats 120 and 122 which employs inertial forces. Inertial separation supplements the primary separation obtained with the start-stop conveyor motion control by separating flat 120 from a substantially overlapping flat 122. The inertial separation scheme utilizes pulsed electrical signals sent from the control (not shown) to the drive wheels 24, 26, and 28 to provide quick acceleration intervals for conveyors 14, 16, and 18, respectively.

FIG. 4a shows that by pulsing drive wheel 26, conveyor belt 16 is moved forward carrying with it flat 120, and that the passenger flat 122 slides backward due to gravity. This result is produced because the flat 120 has a strong frictional connection with the underlying conveyor belt 16 and the flat 122 has a weak frictional connection with the underlying flat 120. The drive wheel 26 is pulsed at an acceleration rate that is great enough to overcome the weak frictional engagement between the two flats 120 and 122 but smaller than that required to overcome the strong frictional engagement between the flat 120 and the conveyor belt 16.

FIG. 4b shows that flat 120 can be pulled from underneath a flat 122 which has a portion in contact with rear conveyor 14 by pulsing the drive wheel 26 of front conveyor 16. If rear conveyor 14 is stationary, the separation of flats 120 and 122 is similar to that described with the primary, frictional separation scheme. If the front and rear conveyors, 16 and 14, respectively, are accelerating at the same rate, the flat 120 can still be separated by inertial forces because pulsing the drive wheel 26 will cause the flat 120 to accelerate at a faster rate than the flat 122 during the pulse intervals. Hence, the flat 120 will tend to be pulled from under mail flat 122 with each succeeding pulse.

FIG. 4c shows a situation where the inertial separation probably will not separate flats 120 and 122. Because each flat 120 and 122 is frictionally engaged with conveyor 16, each will advance with the acceleration pulses of the drive wheel 26 at the same rate. The flats 120 and 122 will be separable using the primary separation technique of running the front conveyor, which is 18 in FIG. 4c, and stopping the rear conveyor, which is 16 in FIG. 4c.

FIG. 5 shows the preferred electrical signal used for pulsing the drive wheels 24, 26, and 28 of conveyors 14, 16, and 18, respectively, with the time component noted on the X-axis and the velocity component noted on the Y-axis. The essence of the inertial separation technique is that the acceleration rate, expressed in "Gs", is always greater than the anticipated coefficient of friction between flats, but is always less than the frictional coefficient between the transport belt and the flat. As used above, the term "G" is defined as the pulsing acceleration rate (in/sec$^2$) divided by the acceleration of gravity (in/sec$^2$). From FIG. 5, constant velocity is not a component of the pulse shape since it does not contribute any separation force (i.e., mail pieces moving at the same rate are not be separated). A saw tooth electrical signal with an acceleration rate, expressed in "Gs", that is greater than the expected frictional coefficient between the mail pieces is ideal. In addition, minimizing the time duration of acceleration pulses maximizes the number of separation opportunities which are available in the advancement process. Based on an estimated average velocity of fifteen to twenty inches per second conveyor speed, system throughput requirements can be satisfied when processing average length flats and considering throughput losses due to processing anomalies. Since the average velocity is fifty percent of the maximum with a saw tooth pulse, the maximum velocity required would be forty inches per second. At a one "G" rate, the time of acceleration would then be 0.104 seconds, and the maximum number of pulses per second would be approximately nine. Assuming an average conveyor velocity of twenty inches per second, there would be five opportunities for separation per foot of conveyor length.

Referring to FIG. 6, it is illustrated that rearward gravitational forces aid in separating flats 130, 132, 134, and 136. Each of the singulating conveyors 14, 16, and 18 are inclined such that adjacent flats 130, 132, 134, and 136 tend to slide rearwardly when adjacent conveyors 14 and 16 are either both stationary or both moving. The degree of sliding is dependent on the degree of incline and the amount of surface area 138 the flat 130, 132, 134, or 136 has in contact with a high friction conveyor belt 14 or 16. As described above, the contacting surfaces 140 between adjacent flats 130, 132, 134, and 136, have very low friction and tend to allow passenger flats to slide. Flat 130 is laying flat against conveyor belt 16 and will not slide due to gravity. Flat 132 has a large area 138 in contact with conveyor belt 14 and is not likely to slide rearward due to gravity. Conversely, flats 134 and 136 have relatively small amounts of surface area 138 in contact with conveyor belt 14 and are likely to slide rearward due to gravitational forces.

The degree of incline for singulating conveyors 14, 16, and 18 to promote gravitational separation is not unlimited. Magazines which do not have wrappers only have their covers in contact with the conveyor belt 14, 16, or 18. Therefore, a major portion of the magazine is not restrained from sliding as is the case with a fully enclosed envelope, i.e., no containment exists to prevent gravitational forces from unravelling the magazine as it moves up the incline. A heavy magazine with a thin flexible cover is believed to be the worst item to be moved up an inclined conveyor 14, 16, or 18. It is estimated that an inclined slope angle of twenty to twenty five degrees permits some gravitational effects while at the same time, avoiding the unravelling of troublesome items such as magazines. In addition to providing some rearward gravitational separation forces, the incline angle also aids in the inertial separation procedure since the top most flats are moved rearward both by gravity and slipping on underlying flats.

Referring to FIG. 7, it is illustrated that forward gravitational forces at the output slide 22 may also separate mail flats 150 and 152. The normal function of the inclined output slide 22 is to deliver single and correctly squared flats to the next stage of mail processing. In a few instances, flats whose trailing edges are mechanically held together (i.e., by a dog ear fold) will pass through the apparatus 10 without being separated. In these instances, the drive wheels 56 of the skew correction station 20 are halted when the flats 150 and 152 reach a point where the frictional engagement of the drive wheels 56 and belts 54 with the flat 152 prevents the flat 152 from sliding and gravitational forces cause the passenger flat 150 to slide freely downward onto the output slide 22. An optical scanning sensor 154 can be provided to detect when the two flats 150 and 152 have separated.

Figure 8A:
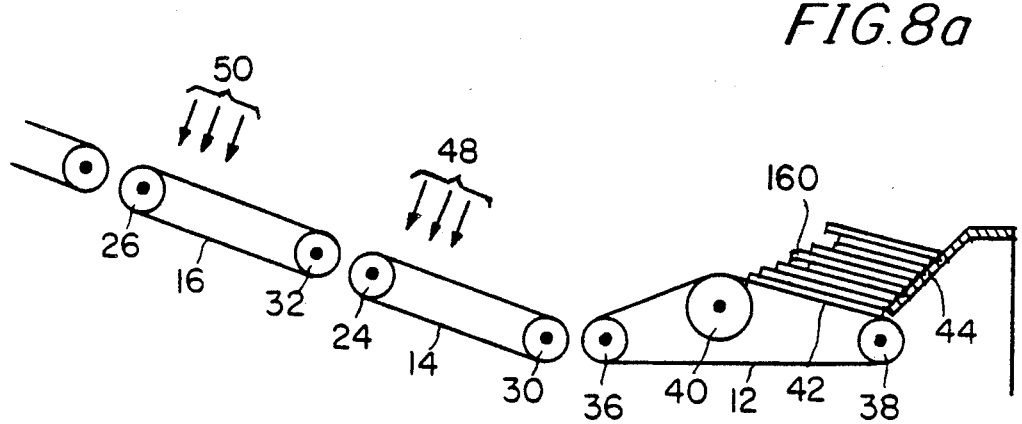
FIGS. 8a-d are side views of the input and singulation subsystems illustrating the use of optical detectors to achieve singulation.
Figure 8B:
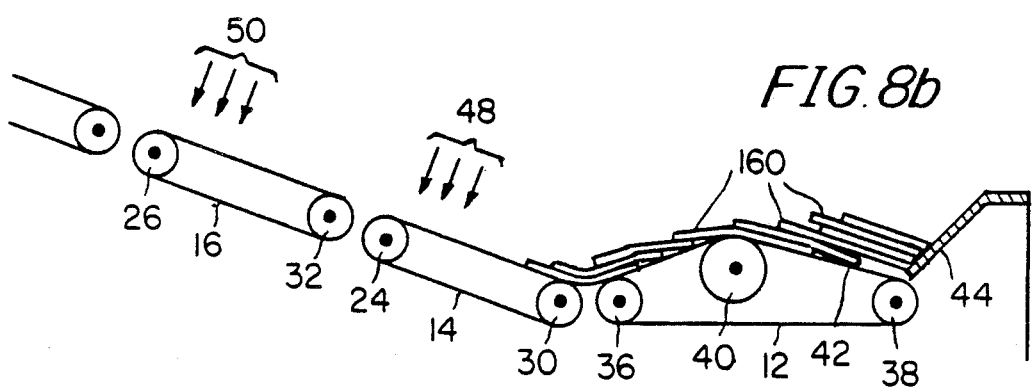
Figure 8C:
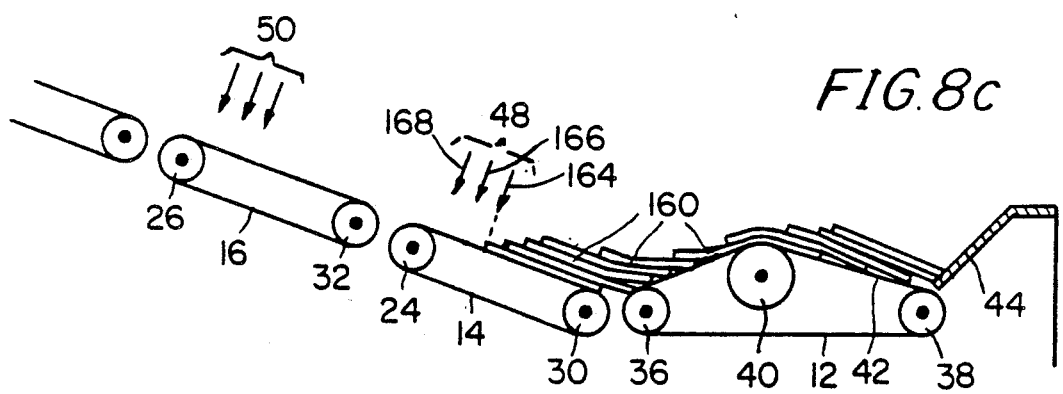
Figure 8D:
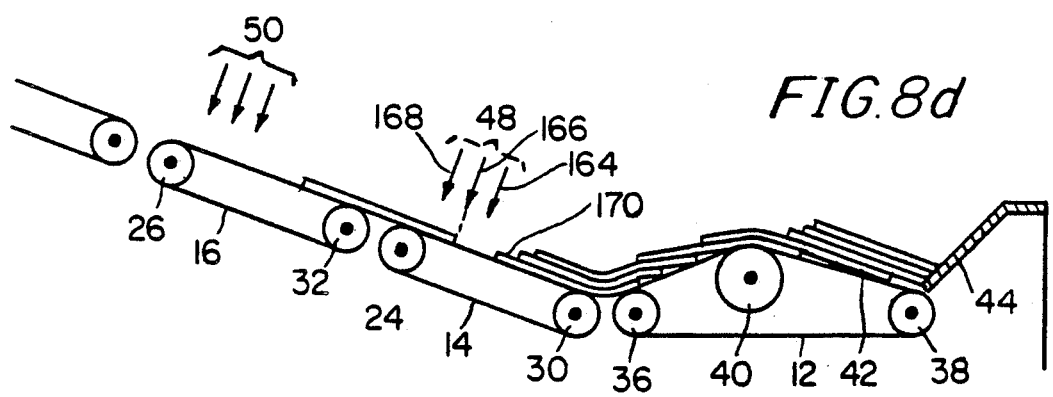

FIGS. 8a-d illustrate the operation of the input and singulating conveyor subsystems to achieve the singulation of a flat from a stack of mail. FIG. 8a shows a stack of mail 160 is randomly loaded onto the inclined portion 42 of input conveyor 12. FIG. 8b shows that the stack of mail 160 becomes coarsely "shingulated" as it advances up the incline 42. The bottom most flat 162 leads the running shingle of mail 160 onto the first, inclined, singulating conveyor belt 14. Both the input conveyor 12 and the singulating conveyor 14 move at approximately the same rate. When a first sensor 164 in array 48, as best shown in FIG. 8c, detects the leading edge of flat 162, the input conveyor 12 is directed to stop while the singulating conveyor 14 attempts to separate the underlying flat 162 from the rest of the mail 160. As long as the sensor array 48 detects satisfactory advancement of flat 162 up inclined conveyor 14, the remaining mail 160 is restrained by frictional engagement with input conveyor belt 12. FIG. 8d shows that detector 166 confirms full separation of flat 162 from the stack of mail 160. Confirmation of separation reactivates the movement of input conveyor 12 in unison with singulating conveyor 140 to repeat the singulation process on succeeding flat 170.

If the advancement of flat 162 is determined to be tardy or non-existent under the control of singulating conveyor 14 while input conveyor 12 is inactive, then the input conveyor 12 is directed to resume advancement to aid the singulating conveyor 14 in its task. This form of detection, control and advancement of adjacent conveyors 12, 14, 16, and 18 is initiated by the succeeding detectors in each sensor array 48, 50, and 52, i.e, 166 and 168 in array 48, which anticipate the arrival of an advancing flat based on its velocity and arrival time at each detector 164, 166, and 168, etc. The process is repeated continuously until a flow of singulated or shingled mail is detected to be moving up the inclined conveyors 14, 16, and 18. In so doing, the process continually reduces the degree of resistance experienced in separating flats to ultimately produce a continuous, singulated flow.

It is possible that what appears to be true singulation is in fact multiple items stacked one on top of the other. This most likely occurs when the sliding friction between two items is higher than normal and, therefore, unable to take advantage of rearward gravitational separation. In these instances, the inertial separation function, described in conjunction with FIGS. 4a-b, can be applied, either as a result of laser scanning detection of the "passenger" flat or as a programmed function of the scheme at several points along the length of each conveyor 14, 16, or 18, to provide the back up agitation necessary to break apart the static friction resistance to separation. After breaking stacked items apart, the primary separation scheme of stopping the rear conveyor while advancing the front conveyor achieves the desired singulation.

Figure 9:
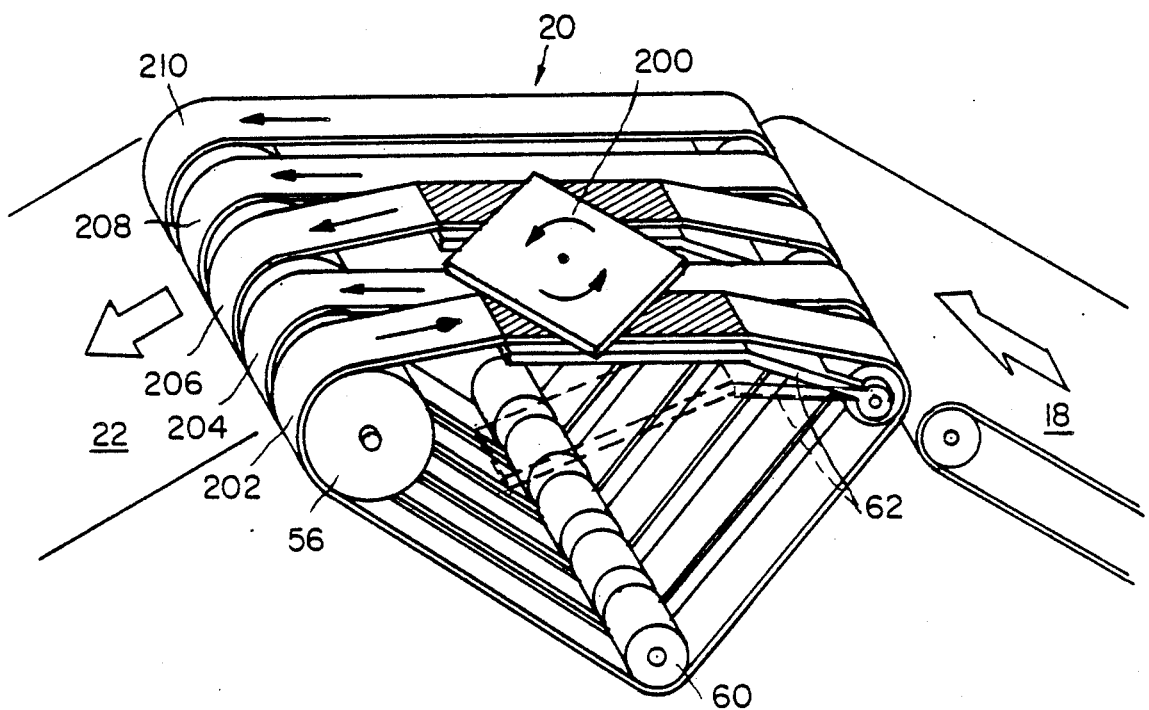
FIG. 9 is an isometric view of the skew correction stage illustrating the rough squaring of a mail piece.
Figure 10:
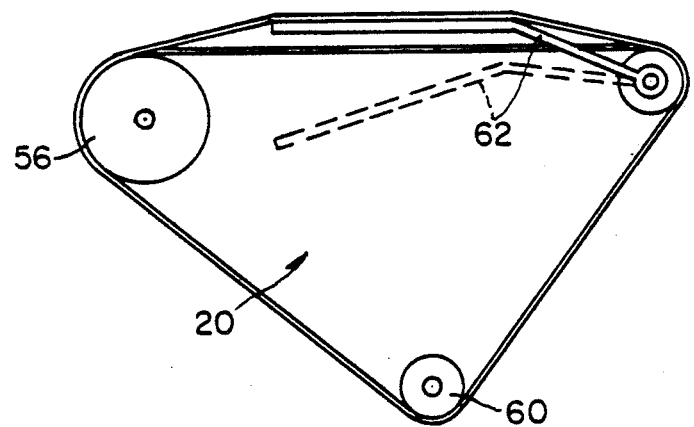
FIG. 10 is a side view of the skew correction stage illustrating operation of the lifter arms.
Figure 11A:
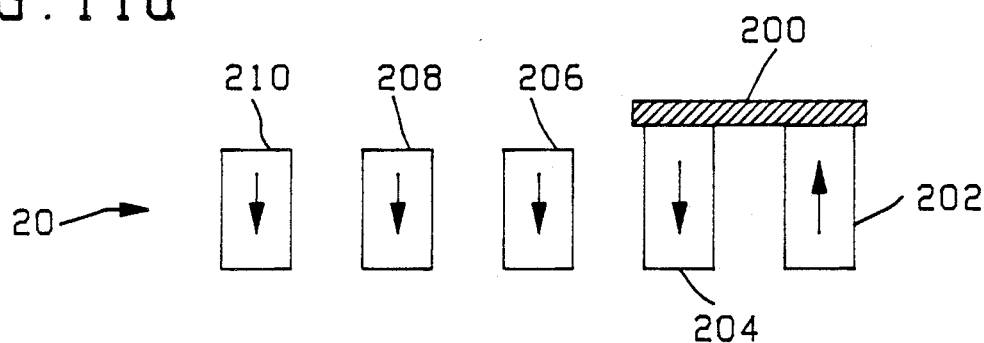
FIGS. 11a-d are front elevational views of the parallel belts in the skew correction stage illustrating the lifting and directional control of the belts.
Figure 11B:
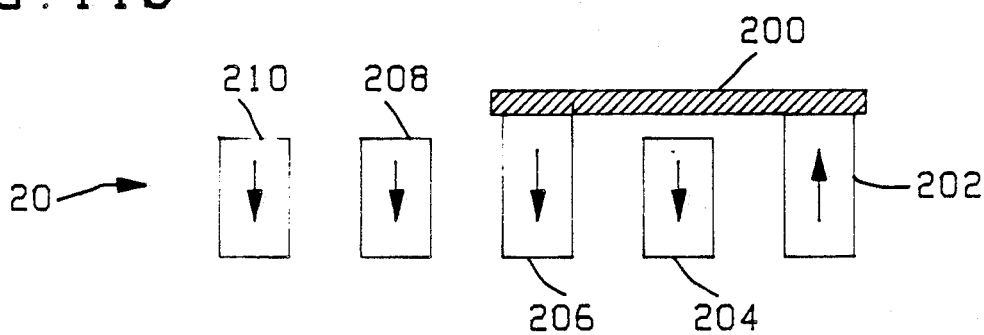
Figure 11C:
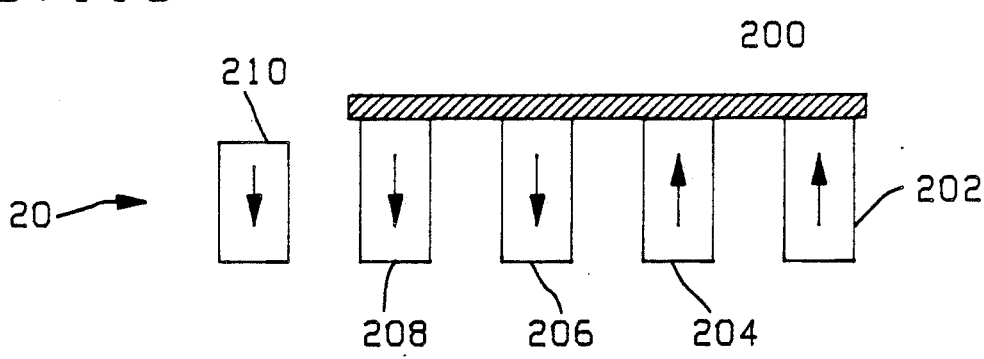
Figure 11D:
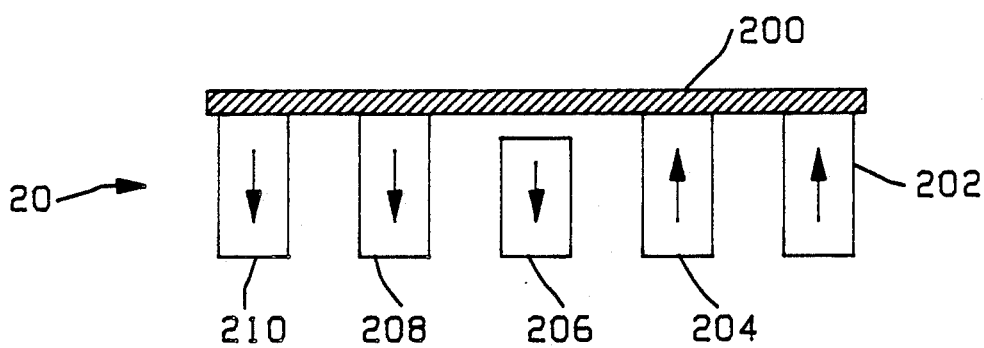

Referring now to FIGS. 1, 9, and 10, the orientation of singulated flats 200 is corrected at the skew correction station 20. When a flat 200 arrives at the skew correction station 20, a sensor array 64 detects the orientation of the flat 200. If it is determined that the orientation of the flat 200 needs to be corrected, the skew correction station 20 is operated to make the correction. The skew correction station 20 is comprised of five parallel skew belts 202, 204, 206, 208, and 210 with a separate lifter arm 62 positioned beneath each belt 202, 204, 206, 208, and 210. By lifting appropriate belts 202 and 206, halting the forward progress of flat 200, and then moving the belts 202 and 206 in opposite directions to correct the skew, the mail flat 200 can be roughly squared. Preferably, the belts 202, 204, 206, 208 and 210 are two inches wide and are spaced two inches apart. With a wider area covered by the belts 202, 204, 206, 208, and 210, the position of flat 200 on the skew correction station 20 becomes less critical. As described above, the belts 202, 204, 206, 208, and 210 are made of high friction rubber materials. A control (not shown) is provided to analyze input from the skew detector array 64, to control the direction of motion of each belt 202, 204, 206, 208, and 210, and to selectively actuate the individual lifter arms 62.

FIGS. 11a-d show front elevational views of the skew correction station 20 in a variety of combinations of raised belt patterns which could be employed to correct the skew of flat 200. The patterns are based on the size and placement of flats 200 on the belts 202, 204, 206, 208, and 210. It is anticipated that many other patterns can be programmed for correcting skew conditions. FIGS. 11a-d also indicate the direction of motion of each belt. Depending on the lifted belt patter, the belts 202, 204, 206, 208, and 210 are operated such that flat 200 is rotated to a roughly square orientation. As described above, final squaring of flat 200 is achieved using the ledge 66 of output slide 22.

While the invention has been described in terms of its preferred embodiment wherein an apparatus automatically and continuously produces a flow of individual, correctly oriented pieces of mail to be sorted by further processing, those skilled in the art will recognize that the techniques for producing a running shingle, separating flats from one another, and squaring the orientation of the flats can be varied within the spirit and scope of the appended claims.

Having thus described our invention, what we intend to secure by Letters Patent is the following:

1. An apparatus for separating and orienting mail pieces, comprising:
    a plurality of conveyors arranged in series, each of said conveyors having a belt capable of engaging a surface of a mail piece;
    a detector array positioned to detect a mail piece positioned on a conveyor;
    a means for driving each of said plurality of conveyors; and
    a means for controlling said means for driving to achieve automated separation of overlapping mail pieces on said plurality of conveyors in accordance with information from said detector array, said means for controlling being capable of simultaneously advancing a pair of adjacent conveyors in said plurality, said means for controlling being capable of advancing a succeeding one of said pair of adjacent conveyors while halting a preceding one of said pair of adjacent conveyors at a time when said overlapping mail pieces bridge between said pair of adjacent conveyors.

2. An apparatus as recited in claim 1 wherein said plurality of conveyors are positioned at an upwardly inclined angle, said upwardly inclined angle allowing a rearward gravitational force to act against mail pieces progressing up each of said conveyors in said series.

3. An apparatus as recited in claim 2 wherein said inclined angle is between twenty and twenty five degrees.

4. An apparatus as recited in claim 1 wherein said means for controlling said means for driving is capable of sending a pulsed signal to quickly accelerate and then quickly decelerate each of said conveyors.

5. An apparatus as recited in claim 4 wherein said pulsed signal is saw toothed where the time for quick acceleration is shorter than the time for deceleration.

6. An apparatus as recited in claim 1 further comprising a means for creating a running shingle from a stack of mail pieces, said means for creating said running shingle being positioned before a first conveyor in said series and close enough to said first conveyor that mail pieces in said running shingle are transferred onto said first conveyor.

7. An apparatus as recited in claim 6 wherein said means for creating said running shingle comprises a high friction belt conveyor having an upwardly inclined portion which forces said stack of mail pieces to lean backwards.

8. An apparatus as recited in claim 7 wherein said means for controlling said means for driving in said series of conveyors is connected to a drive means for said high friction belt conveyor used in creating said running shingle, said means for controlling being able to simultaneously advance said first conveyor in said series and said high friction belt conveyor used in creating said running shingle as well as advancing said first conveyor in said series while halting said high friction belt conveyor used in creating said running shingle.

9. An apparatus as recited in claim 1 further comprising a means for orienting mail pieces positioned after a last conveyor in said series and close enough to said last conveyor that said mail pieces are transferred from said last conveyor onto said means for orienting said mail pieces.

10. An apparatus as recited in claim 9 wherein said means for orienting said mail pieces comprises:
   a plurality of parallel conveyor belts, each of said conveyor belts being capable of moving in a forward or reverse direction;
   a sensor array positioned to detect the orientation of a mail piece on said plurality of parallel conveyor belts;
   a means for selectively lifting each of said parallel conveyor belts; and
   a means for controlling the movement of each of said belts which uses orientation information from said sensor array to selectively halt or move particular belts of said plurality in either a forward or reverse direction.

11. An apparatus as recited in claim 10 wherein said means for selectively lifting each of said parallel conveyor belts comprises a plurality of lifter arms, each of said lifter arms being pivotable from a first position not in contact with a belt to a second position which moves said belt upward.

12. An apparatus as recited in claim 10 further comprising a control which synchronizes said means for selectively lifting with said means for controlling the movement of each of said belts.

13. An apparatus as recited in claim 9 further comprising an output slide positioned adjacent said means for orienting said mail pieces, said output slide being inclined such that mail pieces discharged from said means for orienting said mail pieces slide downward, said output slide having a ledge for squaring each of said mail pieces discharged.

14. An apparatus for orienting mail pieces, comprising:
   a plurality of parallel conveyor belts, each of said conveyor belts being capable of moving in a forward or reverse direction;
   a sensor array positioned to detect the orientation of a mail piece on said plurality of parallel conveyor belts;
   a means for selectively lifting each of said parallel conveyor belts; and
   a means for controlling the movement of each of said belts which uses orientation information from said sensor array to selectively halt or move particular belts of said plurality in either a forward or reverse direction.

15. An apparatus as recited in claim 14 wherein said means for selectively lifting each of said parallel conveyor belts comprises a plurality of lifter arms, each of said lifter arms being pivotable from a first position not in contact with a belt to a second position which moves said belt upward.

16. An apparatus as recited in claim 14 further comprising a control which synchronizes said means for selectively lifting with said means for controlling the movement of each of said belts.

17. An apparatus for separating and orienting mail pieces, comprising:
   a plurality of conveyors arranged in series, each of said conveyors having a high friction belt capable of engaging a surface of a mail piece, each of said conveyors having a drive means;
   detector arrays positioned to detect a mail piece positioned on a conveyor;
   a means for controlling each of said drive means in accordance with information signalled from said detector arrays, said means for controlling being capable of simultaneously advancing a pair of adjacent conveyors in said plurality as well as advancing a succeeding one of said pair of adjacent conveyors while halting a preceding one of said pair of adjacent conveyors;
   a means for creating a running shingle from a stack of mail pieces, said means for creating said running shingle being positioned before a first conveyor in said series and close enough to said first conveyor that mail pieces in said running shingle are transferred onto said first conveyor; and
   a means for orienting mail pieces positioned after a last conveyor in said series and close enough to said last conveyor that said mail pieces are transferred from said last conveyor onto said means for orienting said mail pieces.

18. An apparatus as recited in claim 17 wherein said means for orienting said mail pieces comprises:
   a plurality of parallel conveyor belts, each of said conveyor belts being capable of moving in a forward or reverse direction;
   a sensor array positioned to detect the orientation of a mail piece on said plurality of parallel conveyor belts;
   a means for selectively lifting each of said parallel conveyor belts; and
   a means for controlling the movement of each of said belts which uses orientation information from said sensor array to selectively halt or move particular belts of said plurality in either a forward or reverse direction.

19. A method for singulating items comprising the steps of:
   providing a plurality of conveyors in a series, each of said conveyors having a belt for engaging an item in contact therewith;
   depositing a plurality of items on said conveyors; and
   driving a pair of adjacent conveyors in said series in a controlled manner to achieve automatic separation of overlapping items deposited on said plurality of conveyors such that succeeding and preceding conveyors in said series either advanced simultaneously or said succeeding conveyor advances while said preceding conveyor is halted at a time when said overlapping items bridge between said pair of adjacent conveyors.

20. A method as recited in claim 19 further comprising the step of orienting said conveyors in said series at an inclined angle.

21. A method as recited in claim 19 further comprising the step of providing pulsed acceleration signals to a conveyor in said series.

22. A method for singulating items comprising the steps of:

providing a plurality of conveyors in a series, each of said conveyors having a high friction belt for engaging an item in contact therewith;

orienting said conveyors in said series at an inclined angle;

depositing a plurality of items on said conveyors;

selectively controlling the operation of adjacent conveyors in said series such that succeeding and preceding conveyors in said series are either advancing simultaneously or said succeeding conveyor is advancing while said preceding conveyor is halted; and providing pulsed acceleration signals to a conveyor in said series.

23. A method for correcting the skewed orientation of an item comprising the steps of:

providing a plurality of conveyor belts;

depositing an item on said plurality of conveyor belts such that said item bridges at least two of said parallel conveyor belts;

determining the orientation of said deposited item;

moving a first conveyor belt in contact with said item in a first direction and moving a second conveyor belt in contact with said item in a second direction, said second direction being opposite said first direction, the amount of movement of said first and second conveyor belts being dependent on the determined orientation of said deposited item; and lifting said first and second conveyor belts above the remaining conveyor belts in said plurality before performing said step of moving.

* * * * *